(12) United States Patent
Snyder et al.

(10) Patent No.: US 12,095,397 B2
(45) Date of Patent: Sep. 17, 2024

(54) SYSTEMS AND METHOD FOR CONTROLLING FLOW OF COOLANT TO COMPONENTS OF A VEHICLE

(71) Applicant: Cummins Inc., Columbus, IN (US)

(72) Inventors: David B. Snyder, Greenwood, IN (US); Andrew W. Osburn, Nashville, IN (US); Anant Puri, Greenwood, IN (US)

(73) Assignee: Cummins Inc., Columbus, IN (US)

(*) Notice: Subject to any disclaimer, the term of this patent is extended or adjusted under 35 U.S.C. 154(b) by 245 days.

(21) Appl. No.: 17/709,653

(22) Filed: Mar. 31, 2022

(65) Prior Publication Data
US 2023/0318516 A1 Oct. 5, 2023

(51) Int. Cl.
| | |
|---|---|
| *H02P 29/60* | (2016.01) |
| *B60K 6/28* | (2007.10) |
| *B60K 11/02* | (2006.01) |
| *B60W 20/00* | (2016.01) |
| *B60W 50/00* | (2006.01) |
| *G07C 5/08* | (2006.01) |

(52) U.S. Cl.
CPC ............ *H02P 29/60* (2016.02); *B60K 6/28* (2013.01); *B60K 11/02* (2013.01); *B60W 20/00* (2013.01); *B60W 50/00* (2013.01); *G07C 5/0808* (2013.01); *B60W 2050/0026* (2013.01); *B60W 2510/081* (2013.01); *B60W 2510/083* (2013.01); *B60W 2510/087* (2013.01)

(58) Field of Classification Search
CPC ........... H02P 29/60; B60K 6/28; B60K 11/02; B60W 20/00; B60W 50/00; B60W 2050/0026; B60W 2510/081; B60W 2510/083; B60W 2510/087; G07C 5/0808

USPC ........................................................ 318/76
See application file for complete search history.

(56) References Cited

U.S. PATENT DOCUMENTS

| | | | |
|---|---|---|---|
| 6,651,761 B1 * | 11/2003 | Hrovat ................. | B60L 15/20 |
| | | | 165/41 |
| 6,705,254 B1 | 3/2004 | Grabowski | |
| 9,096,207 B2 | 8/2015 | Madurai Kumar | |
| (Continued) | | | |

OTHER PUBLICATIONS

Li et al. (CN 111636959 A)Method for Controlling an Electric Coolant Valve of an Internal Combustion Engine Date Published Sep. 8, 2020 (Year: 2020).*

(Continued)

*Primary Examiner* — Jorge L Carrasquillo
(74) *Attorney, Agent, or Firm* — Faegre Drinker Biddle & Reath LLP

(57) ABSTRACT

A controller for controlling flow of coolant to one or more components of a vehicle is disclosed. The controller determines respective amounts of heat expected to be rejected by the one or more components of the vehicle in a steady state of operation at current operating conditions of the one or more components, and generates a feedforward flow control signal based at least in part on the determined amounts of heat and a target temperature for the one or more components. The controller generates a controller output signal based at least in part on the feedforward control signal, and provides the controller output signal to the cooling system to control flow of coolant to the one or more components of the vehicle from the cooling system in accordance with the determined amounts of heat expected to be rejected by the one or more components of the vehicle.

19 Claims, 6 Drawing Sheets

(56) References Cited

U.S. PATENT DOCUMENTS

| | | |
|---|---|---|
| 9,869,232 B2 | 1/2018 | Abihana |
| 2011/0246007 A1 | 10/2011 | Choi |
| 2014/0000859 A1 | 1/2014 | Abihana |

OTHER PUBLICATIONS

KR 101689305 B1 (Cooling Device for a Motor Vehicle) Date Published Dec. 23, 2016 (Year: 2016).*
WO 2020110509 A (Vehicle Air Conditioner) Date Published Jun. 4, 2020 (Year: 2020).*

* cited by examiner

SYSTEMS AND METHOD FOR CONTROLLING FLOW OF COOLANT TO COMPONENTS OF A VEHICLE

FIELD OF TECHNOLOGY

The present disclosure relates generally to coolant systems, and more specifically to controlling flow of coolant in vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Coolant systems are utilized in vehicles to ensure that various components of the vehicles are operated at suitable temperatures, such as temperatures that do not exceed maximum temperatures for which the components are rated and/or at which the components can be efficiently operated. Such cooling systems typically provide a constant flow of coolant to the components, for example by running a coolant pump that pumps coolant to the components at a constant speed, or implement on-off switching to provide coolant to the components, for example by pumping coolant to the components at predetermined time interval or at times when coolant is needed by the components. Such coolant systems are often inefficient because more coolant than needed may be provided to the components, and more energy than needed may be utilized by a coolant pump to pump the coolant to the components. Accordingly, there is a need for a cooling system that provides more efficient cooling of components of the vehicle.

SUMMARY

According to some embodiments, a system for controlling flow of coolant to one or more components of a vehicle is provided. The system includes a cooling system configured to provide coolant, via a coolant loop, to the one or more components of the vehicle. The system also includes a controller communicatively coupled to the cooling system. The controller is configured to determine one or more current operating conditions of the one or more components of the vehicle, and determine respective amounts of heat expected to be rejected by the one or more components of the vehicle in a steady state of operation at the one or more current operating conditions of the one or more components. The controller is also configured to generate a feedforward flow control signal based at least in part on i) the determined amounts of heat expected to be rejected by the one or more components of the vehicle and ii) a target temperature for the one or more components of the vehicle. The controller is further configured to generate a controller output signal based at least in part on the feedforward control signal, and provide the controller output signal to the cooling system to control flow of coolant to the one or more components of the vehicle from the cooling system in accordance with the determined amounts of heat expected to be rejected by the one or more components of the vehicle.

According to certain embodiments, a controller is provided. The controller includes a processor, and a memory including instructions that, when executed by the processor, cause the controller to perform operations. The operations include receiving one or more feedforward input signals indicative of one or more current operating conditions of a vehicle, and determining respective amounts of heat expected to be rejected by the one or more components of the vehicle in a steady state of operation at the one or more current operating conditions of the one or more components. The operations also include generating a feedforward flow control signal based at least in part on i) the determined amounts of heat expected to be rejected by the one or more components of the vehicle and ii) a target temperature for the one or more components of the vehicle. The operations further include generating a controller output signal based at least in part on the feedforward control signal, and providing the controller output signal to the cooling system to control flow of coolant to the one or more components of the vehicle from the cooling system in accordance with the determined amounts of heat expected to be rejected by the one or more components of the vehicle.

In some embodiments, a method is provided. The method includes receiving, by a controller, one or more feedforward input signals indicative of one or more current operating conditions of a vehicle, and determining, by the controller, respective amounts of heat expected to be rejected by the one or more components of the vehicle in a steady state of operation at the one or more current operating conditions of the one or more components. The method also includes generating, by the controller, a feedforward flow control signal based at least in part on i) the determined amounts of heat expected to be rejected by the one or more components of the vehicle and ii) a target temperature for the one or more components of the vehicle. The method additionally includes generating, by the controller, a controller output signal based at least in part on the feedforward control signal, and providing, by the controller, the controller output signal to the cooling system to control flow of coolant to the one or more components of the vehicle from the cooling system in accordance with the determined amounts of heat expected to be rejected by the one or more components of the vehicle.

In various embodiments, the feedforward flow control signal is generated further based on a current temperature of the coolant at an input to a system comprising the one or more components of the vehicle. In certain embodiments, the controller receives at least one feedback signal indicative of a current temperature of the one or more components of the vehicle, generates a feedback flow control signal based on a difference between the target temperature and the current temperature of the one or more components of the vehicle, and generates the controller output signal based on both i) the feedforward flow control signal and ii) the feedback flow control signal.

In some embodiments, the channel comprises the vehicle at least partially electric vehicle that comprises an electric motor, and the one or more components of the vehicle includes at least i) the electric motor and ii) an inverter configured to convert direct current (DC) energy from a battery to alternating current (AC) power for driving the electric motor. In certain embodiments, the one or more operating conditions of the one or more components of the vehicle include one or both of i) a current speed of the electric motor of the vehicle and ii) a current torque of the electric motor of the vehicle. In some embodiments, the controller determines the amount of heat expected to be rejected by a component among the one or more components of the vehicle by performing a lookup in a lookup table, wherein the lookup table stores relationships between operating conditions of the vehicle and amounts of heat expected to be rejected by the component in the steady state of operation at the operating conditions.

In certain embodiments, controller is configured to provide the controller output signal to a control input of a variable flow pump to actuate the variable flow coolant pump to provide the flow of coolant to the one or more components of the vehicle in accordance with the determined amounts of heat expected to be rejected by the one or more components of the vehicle. In some embodiments, the controller maps the determined amounts of heat expected to be rejected by the one or more components of the vehicle to a speed of the variable coolant pump and generates the feedforward control signal to control the variable coolant pump to operate at the speed of the variable coolant pump.

In certain embodiments, the vehicle is a hybrid electric vehicle that includes a combustion engine and an electric motor, the one or more components of the vehicle include one or more electrical components, including the electric motor of the vehicle, and the coolant loop of the cooling system is coupled to a radiator configured to provide coolant to both the combustion engine and the electric motor of the vehicle. In some embodiments, the vehicle is a hybrid electric vehicle that includes a combustion engine and an electric motor, the one or more components include one or more electrical components of the vehicle, including the electric motor, and the coolant loop of the cooling system is a first coolant loop coupled to a first radiator configured to provide coolant to the one or more electrical components of the vehicle and a second radiator configured to provide coolant, via a second coolant loop separate from the first coolant loop, the combustion engine of the vehicle.

DETAILED DESCRIPTION

Figure 1:
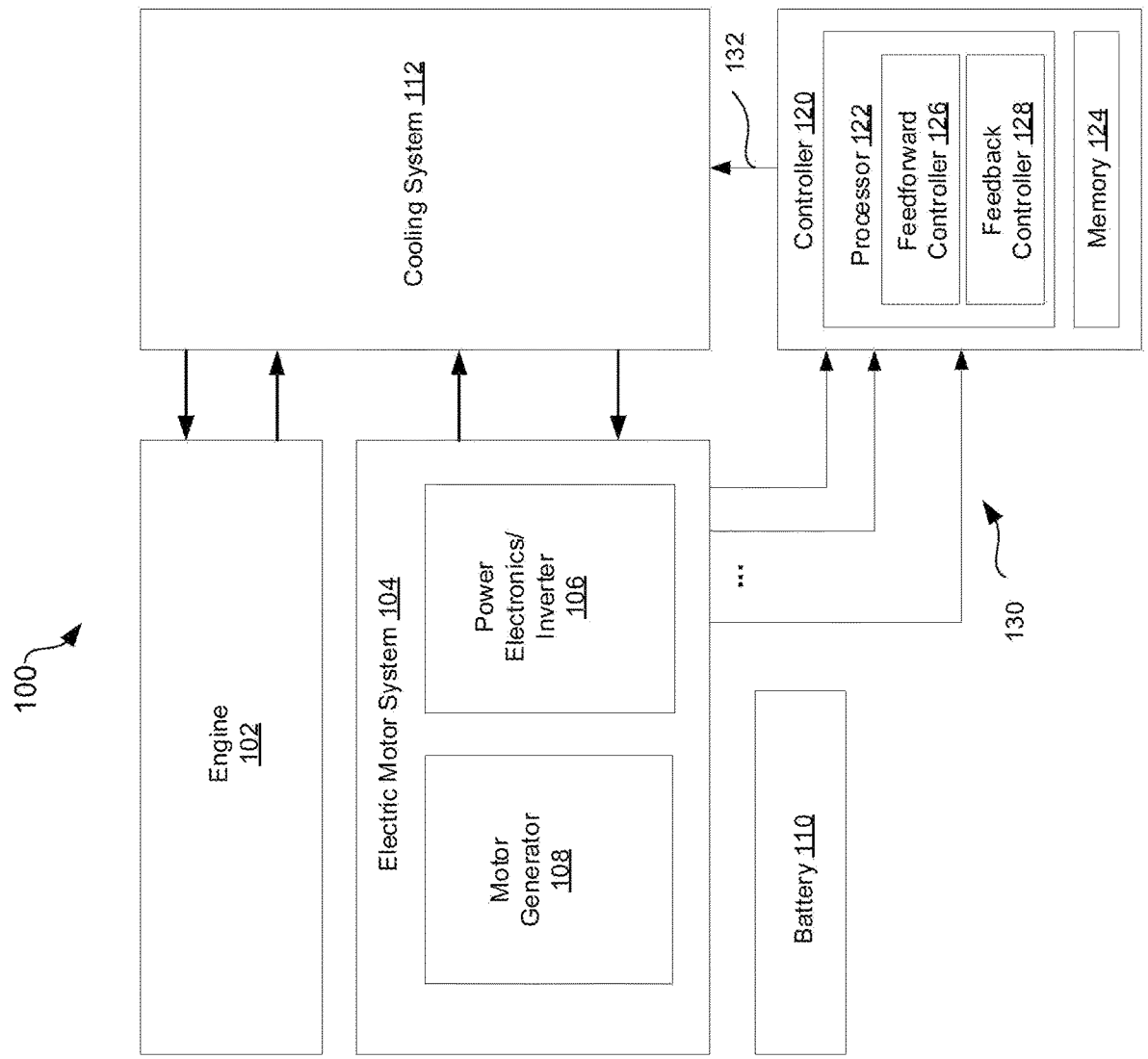
FIG. 1 is a schematic diagram of a powertrain of a vehicle in which a cooling controller is configured to control flow of coolant to one or more components of the vehicle in accordance with expected heat rejection of the one or more components based on current operating conditions of the vehicle, according to an embodiment.

For the purposes of promoting an understanding of the principles of the present disclosure, reference is now made to the embodiments illustrated in the drawings, which are described below. The embodiments disclosed herein are not intended to be exhaustive or to limit the disclosure to the precise form disclosed in the following detailed description. Rather, these embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

One of ordinary skill in the art will realize that the embodiments provided can be implemented in hardware, software, firmware, and/or a combination thereof. Programming code according to the embodiments can be implemented in any viable programming language such as C, C++, HTML, XTML, JAVA or any other viable high-level programming language, or a combination of a high-level programming language and a lower level programming language.

Referring to FIG. 1, a block diagram of a system 100 of a vehicle 101 in which variable coolant flow techniques may be utilized, according to an embodiment. In an embodiment, the system 100 may be part of a powertrain configured to generate power for propelling the vehicle 101. In the embodiment of FIG. 1, the vehicle 101 is a hybrid vehicle having a combustion engine 102 and an electric motor system 104. The combustion engine 102 may be powered by any type of fuel, such as gasoline, diesel, natural gas, liquefied petroleum gases, biofuels, and the like. The electric motor system 104 may include, for example, can be a motor/generator, synchronous motor, induction motor, or any other suitable electric motor system that may receive power from an energy source such as a rechargeable battery pack. Although, for exemplary purposes, the system 100 is illustrated in FIG. 1 as being part of a hybrid vehicle that includes a combustion engine as well as an electric motor system for generating power for propelling the vehicle, the system 100 is not so limited. For example, the system 100 is part of a fully electric vehicle that does not include a combustion engine (e.g., omits the combustion engine 102), in some embodiments. As another example, the system 100 is part of a vehicle that does not include an electric motor system (e.g., omits the electric motor system 104), in some embodiments.

With continued reference to FIG. 1, the electric motor system 104 may include a power electronics module 106 and a motor generator 108. The power electronics module 106 may comprise, for example, an inverter configured to covert direct current (DC) energy that may be derived from a battery 110 to alternating current (AC) power for driving the motor generator 108. Accordingly, the power electronics module 106 is sometimes referred to herein as "inverter" 106. It is noted, however, that the power electronics module 106 may include one or more components in addition to or instead of an inverter for powering the motor generator 108, in some embodiments. The system 100 also includes a cooling system 112 configured to actuate flow of a coolant (e.g., water or other suitable coolant) to the engine 102 and/or the components of the electric motor system 104 during operation of the vehicle 101. In embodiments, the cooling system 112 may include, for example, one or more radiators and one or more pumps configured to pump coolant fluid from the one or more radiators to the engine 102 and/or the components of the electric motor system 104 during operation of the vehicle.

The system 100 also includes a controller 120 communicatively coupled to the cooling system 112. The controller 120 may include a processor 122 and a computer-readable memory 124 with stored computer-readable instructions that, in response to execution by a processor 122, cause processor 122 to perform the functions of controller 120 as described herein. The computer-readable memory 124 may, for example, store a cooling controller 128 in the form of computer-readable instructions that, in response to execution by the processor 122, cause the processor 122 to generate control signals or commands for controlling flow of coolant from the cooling system 118 to the one or more components that need cooling during operation of the vehicle. The computer-readable memory 124 may be a non-transitory memory and may include volatile memory to store computer instructions and data on which the computer instructions operate at runtime (e.g., Random Access Memory or RAM) and, in an embodiment, persistent memory such as a hard disk, for example. Controller 120, processor 122, and memory 124 are not particularly limited and can, for example, be physically separate.

In certain embodiments, the controller 120 forms a portion of a processing subsystem including one or more computing devices having memory, processing, and communication hardware. For example, the controller 120 can be a single device or a distributed device, and the functions of the controller 120 can be performed by hardware and/or as computer instructions on a non-transient computer readable storage medium (e.g., memory 124). In some embodiments, controller 120 includes one or more interpreters, determiners, evaluators, regulators, and/or processors that functionally execute the operations of controller 120. Interpreters, determiners, evaluators, regulators, and processors can be implemented in hardware and/or as computer instructions on a non-transient computer readable storage medium and can be distributed across various hardware or computer-based components.

The controller 120 may include a feedforward controller 126 configured to monitor or otherwise determine current operating conditions of one or more components of the electric motor system 104, and to proactively alter flow of coolant from the cooling system 112 to the electric motor system 104 based on amount of heat expected to be rejected by the one or more components of the electric motor system 104 in a steady state of operation at the current operating conditions of the one or more components of the electric motor system 104. For example, the feedforward controller 126 may be configured to determine a mass flow of coolant needed to remove sufficient amount of heat from the power electronics module 106 and the motor generator 108 in the electric motor system 104 in accordance with expected amount of heat that heat rejected by components in the electric motor system 104, in a steady state of operation at current speed and/or torque of motor generator 108, to ensure that the one or more components are operating at or below a target temperature for the power electronics module 106 and the motor generator 108, in an example embodiment. The controller 120 may determine the current speed and/or torque of the motor generate 108 based on signals 130 that the controller 120 may receive from the electric motor system 104, in some embodiments. For example, one or more sensors (not shown) may be provided for the electric motor system 104 to generate the signals 130 indicative of the current speed and/or torque of the motor generator 108.

In other embodiments, the controller 120 may be configured to determine the speed and/or torque of the motor generator 108 based on other information that may be available to the controller 120, such as information indicative of control of the motor generator 108. In some embodiments, the feedforward controller 126 may generate the feedforward control signal further based on the current temperature of the coolant at the input to the electric motor system 104. The controller 120 may generate a control signal or command 132 based at least in part on the determine the desired mass flow of coolant, and may provide the control signal or command 130 to the cooling system 112 to actuate a component (e.g., a coolant pump) of the cooling system 112 to provide the desired mass flow to the components of the electric motor system 104. The controller 120 may thus proactively control flow of coolant to the one or more components of the electric motor system 104 based on expected heat rejection of the electric motor system 104 to ensure that the components of the electric motor system 104 are kept sufficiently cool (e.g., at or below a target temperature) based on the current operating conditions of the components of the electric motor system 104. For example, at times of increasing speed and/or torque of the motor generator 108, the controller 120 may cause an increase in flow of coolant to the electric motor system 104 to remove access heat that may be generated by the motor generator 108, in an embodiment.

In some embodiments, the controller 120 may additionally include a feedback controller 128. The feedback controller 128 may be configured to receive a feedback signal indicative of current temperature of the one or more components of the electric motor system 104, and generate a feedback controller control signal based on an error between the current temperature of the one or more components of the electric motor system 104 and the target temperature of the one or more of the one or more components of the electric motor system 104. For example, the controller 120 may be configured to add the feedback control signal generated by the feedback controller 128 and the feedforward control signal generated by the feedforward controller 128. The controller 120 may adjust the output control signal based the feedback control signal generated by the feedback controller 128, in an embodiment. Combining feedforward control that is based on the expected amount of heat expected to be rejected by the one or more components in a steady state of operation at current operating conditions with feedback control that is based on current temperature of the one or more components allows the controller 120 to provide efficient control of the cooling system 112 that ensures that the one or more components stay sufficiently cool without unnecessarily overworking the cooling system 112, in various embodiments. Such efficient control may be particularly beneficial for cooling electronic components in systems in which a same coolant is used to cool both the combustion engine 102 and the electric motor system 104, because the electronic components may be particular sensitive to heat and may be affected by heat generated by the combustion engine 102.

Figure 2:
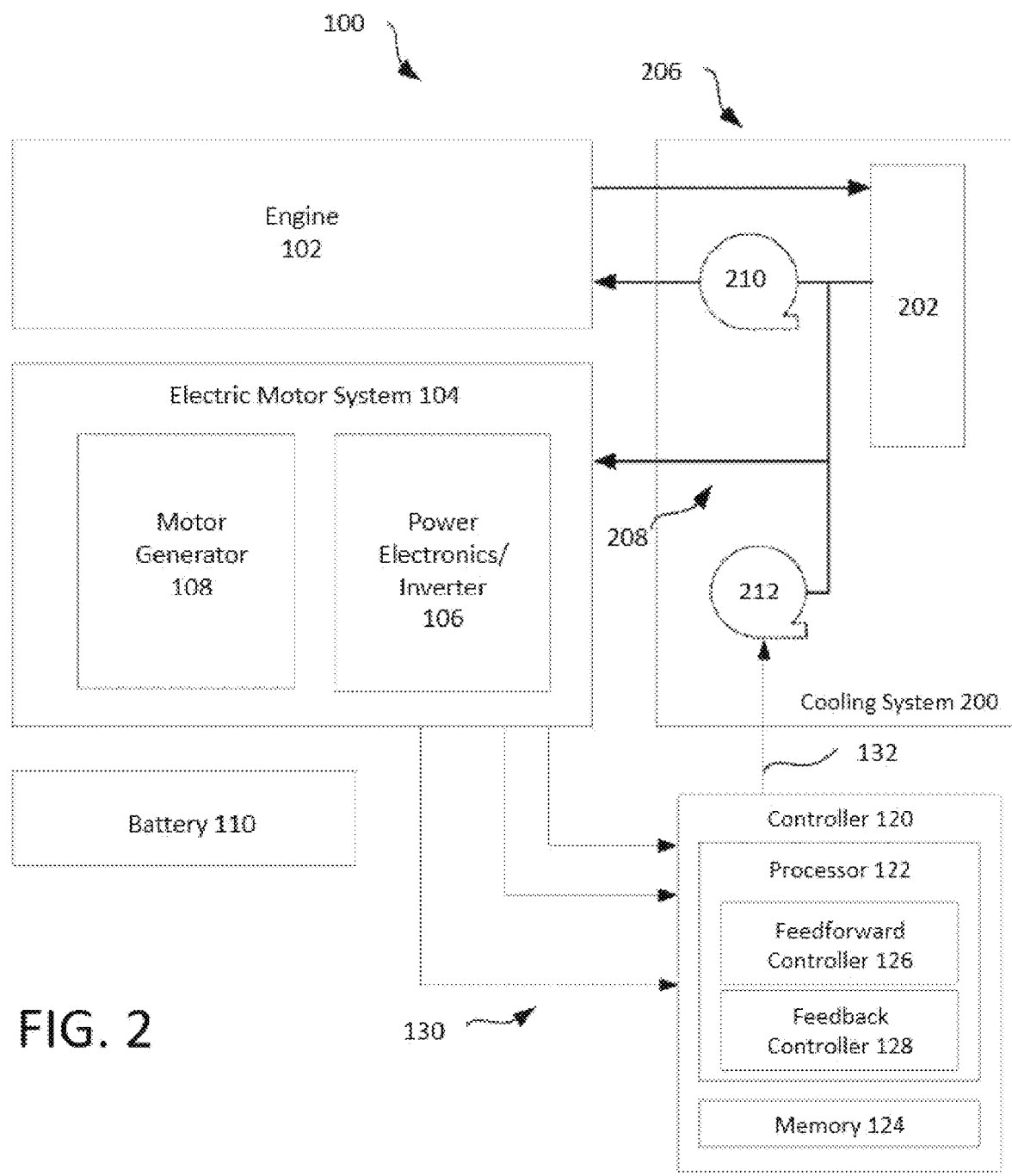
FIG. 2 is a schematic diagram showing details of an example implementation of a cooling system, according to an embodiment.
Figure 3:
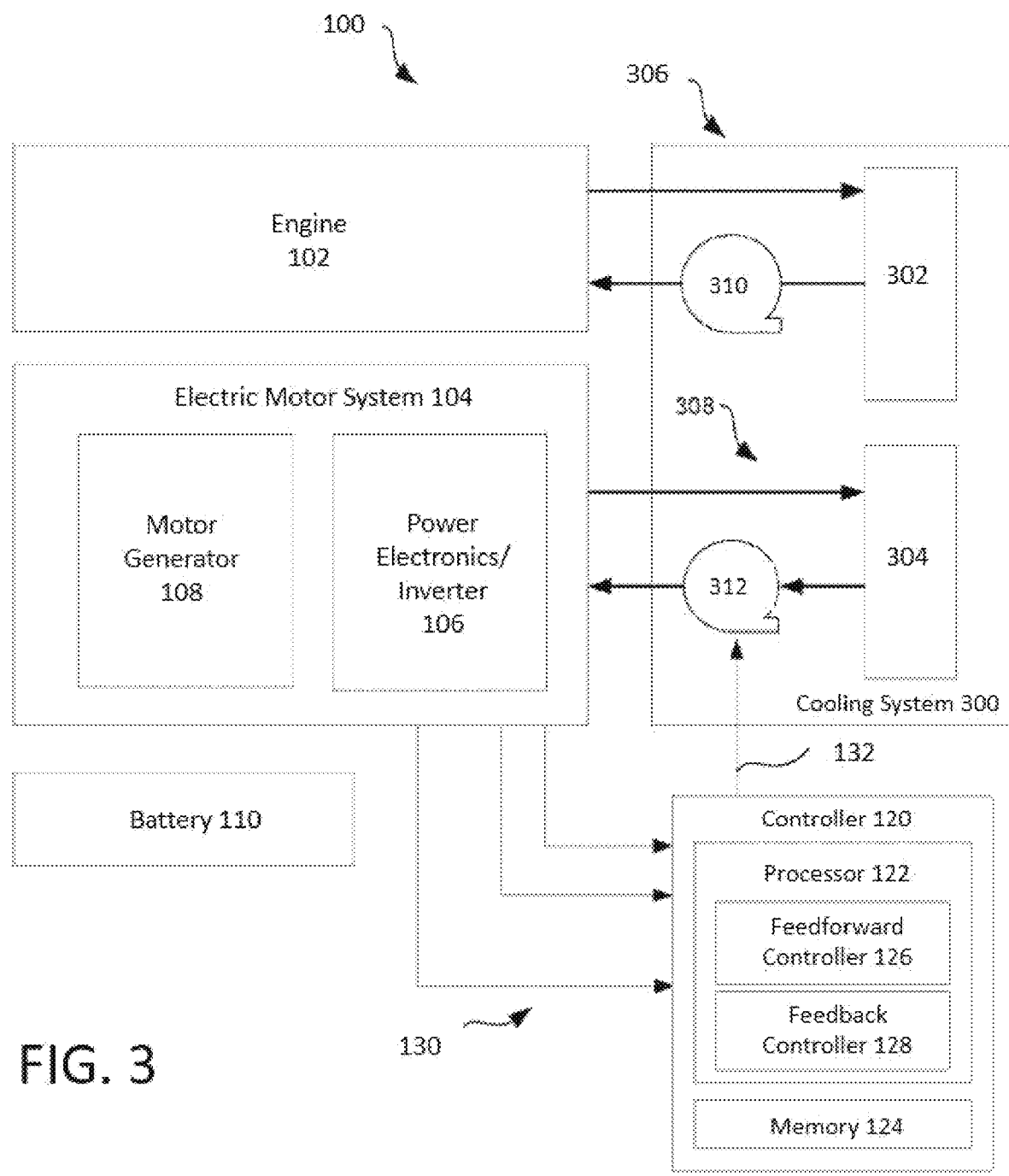
FIG. 3 is a schematic diagram showing details of an example implementation of a cooling system, according to another embodiment.

FIGS. 2 and 3 are diagrams illustrating various example configurations of cooling systems that may be utilized as the cooling system 112, according to some embodiments. Referring first to FIG. 2, a cooling system 200 may correspond to the correspond to the cooling system 112, in an embodiment. In another embodiment, the cooling system 200 may be utilized with a system different from the system 100 of FIG. 1. The cooling system 200 includes a radiator 202 coupled to a first coolant pump 210 and a second coolant pump 212.

The first pump 204 may be coupled via a coolant loop 206 to the engine 102 and configured to pump coolant from the radiator 202 to the engine 102. The second pump 212 may be coupled via a coolant loop 208 to the electric motor system 104 and may be configured to pump coolant from the radiator 202 to components of the electric motor system 104, such as inverter 106 and motor generator 108. Thus, in the embodiment of FIG. 2, the radiator 202 and coolant provided via the coolant loops 206, 208, by the radiator 202, are shared between the engine 102 and the electric motor system 104.

Referring now to FIG. 3, a cooling system 300 may correspond to the cooling system 114, in an embodiment. In another embodiment, the cooling system 200 may be utilized with a system different from the system 100 of FIG. 1. In the embodiment of FIG. 3, the cooling system 300 includes a first radiator 302 coupled to a first pump 310 and a second radiator 304 coupled to a second pump 312. The first pump 310 may be coupled to the engine 102 via a coolant loop 306 and configured to pump coolant from the radiator 302 to the engine 102 via the coolant loop 306. The second pump 312 may be coupled to the electric motor system 104 via a coolant loop 308 and may be configured to pump coolant from the radiator 304 to the electric motor system 104, such as inverter 106 and motor generator 108, via the coolant loop 308. Thus, in the embodiment of FIG. 3, separate radiators 302, 304 and separate coolants are provided via separate coolant loops 306, 308, for cooling, respectively, the engine 102 and the electric motor system 104.

With continued reference to FIGS. 2 and 3, the second coolant pump 212, 312 may be a variable flow pump, in various embodiments. The controller 120 may be configured to control flow of coolant to the electric motor system 104 by controlling operation (e.g., speed, rate, etc.) of the second pump 212, 312, in various embodiments. In an embodiment, the controller 120 is configured to control operation (e.g., speed, rate, etc.) of the second coolant pump 212, 312 based on at least in part on determined or estimated expected amount of heat rejected by the inverter 106 and/or motor generator 108, where the expected amount of heat may be determined or estimated based at least in part on current operating conditions of the inverter 106 and/or motor generator 108, such as current speed and/or torque of the motor generator 108, in an embodiment.

In embodiments, the second coolant pump 212, 312 may be an electric pump (ePump) that may be controllable (e.g., by the controller 120) via a communication interface. In an embodiment, the communication interface may be a control area network (CAN) interface. Thus, the second coolant pump 212, 312 may be controllable (e.g., by the controller 120) via a CAN communication bus, in this embodiment. In other embodiments, other suitable controllable pumps may be utilized. The first pump 210, 310 may be a suitable pump different from the second pump 212, 312, in some embodiments. For example, the first pump 210, 310 may be a mechanical pump. The pump 210, 310 may be driven by the engine 102 via a timing belt, for example. As noted above, however, in some embodiments, a variable flow pump, such as and ePUMP (e.g., a CAN ePUMP) may be utilized to control flow of coolant to the engine 102, in some embodiments. In such embodiments, the first coolant pump 210, 310 may be a variable flow pump, such as and ePUMP (e.g., a CAN ePUMP), and the controller 120 may be configured to control operation of the first coolant pump 210, 310 based at least in part on operating conditions (e.g., speed and/or torque) of the engine 102, in some embodiments.

Figure 4:
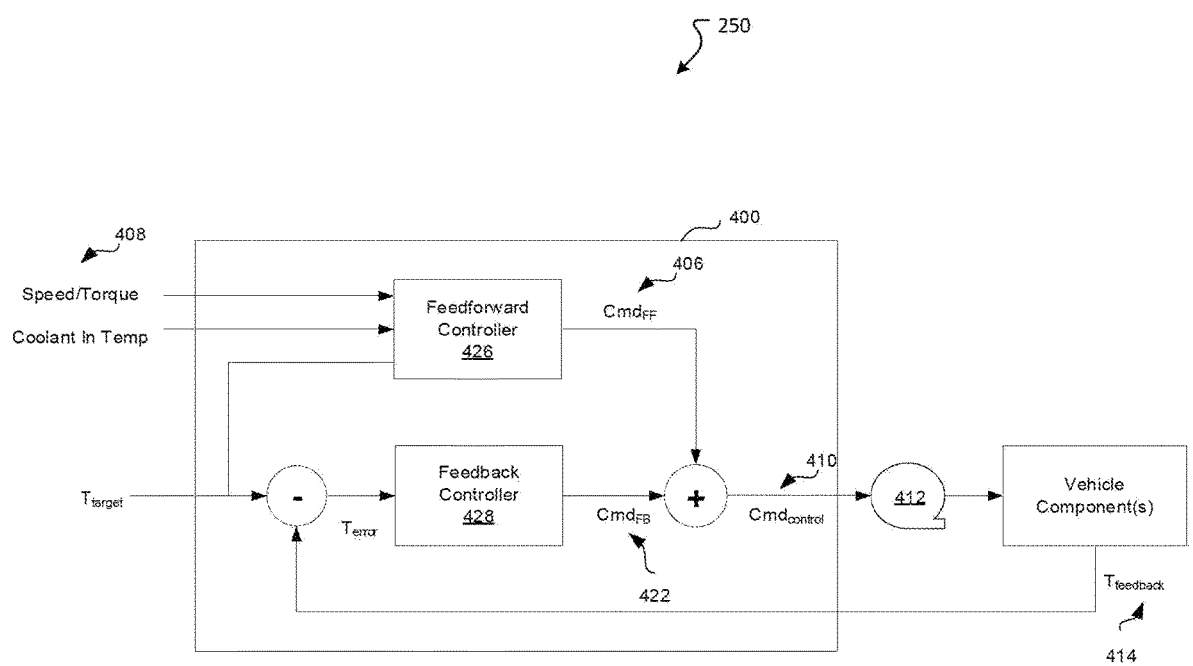
FIG. 4 is a schematic diagram showing an example implementation of a cooling controller, according to an embodiment.

FIG. 4 is a schematic diagram showing an example implementation of a cooling controller 400, according to an embodiment. The cooling controller 400 corresponds to the controller 120 128 of FIG. 1, in an embodiment. The cooling controller 400 may be utilized with a system different from the system 100 of FIG. 1, in other embodiments. The cooling controller 400 includes a feedforward controller 426 that may correspond to the feedforward controller 126 of FIG. 1, in an embodiment. The feedforward controller 426 may be configured to generate a feedforward control signal or command 406 based on input parameters 408 indicative of operating conditions of power electronics module 106 and/or motor generator 108. The input parameters 408 may include an input that indicates a current speed of the motor generator 108, a current torque of the motor generator 108 and a current temperature of input coolant used for cooling the power electronics module 106 and the motor generator 108. The input parameters 408 may be measured, for example by the sensors, or may be estimated based on other parameters that may be known to the controller 400, in various embodiment.

In an embodiment, the feedforward controller 426 is configured to determine a desired mass flow of coolant through the electric motor system 104 that results in a target temperature of the power electronics (e.g., inverter) 106 and/or the motor generator 108. In an example, an internal temperature of the motor generator 108 may generally be higher than an internal temperature of the inverter 106 in steady state of operation. Accordingly, the feedforward controller 426 may determine the mass flow of coolant based on a target temperature for the motor generator 108 in steady state, thereby also ensuring that the inverter 106 is kept at sufficiently low temperature in the steady state, in an embodiment. The feedforward controller 126 may generate the control signal or command 406 based on the desired flow of the coolant through the power electronics (e.g., the inverter) 106 and the motor generator 108, to control the speed of the pump 412 to produce the desired mass flow of coolant through the inverter 106 and the motor generator 108, in an embodiment.

In an embodiment, the controller 400 may additionally include a feedback controller 428 that may correspond to the feedback controller 128 of FIG. 1, in an embodiment. The feedback controller 428 may be configured to adjust control of a pump 412 (that may correspond to the pump 212 in FIG. 2 or the pump 312 in FIG. 3, for example) based on a feedback signal 414 indicative of a measured temperature of the motor generator 108 and/or the power electronics (e.g., the inverter) 106, in at least some situations. The feedback controller 428 may be configured to adjust the control signal 406 generated by the feedforward controller 425 when temperature of the power electronics (e.g., the inverter) 106 and/or motor generator 108 exceeds the target temperature. In such situations, the feedback controller 428 may adjust control of the pump 412 to increase mass flow of the coolant through the inverter 106 and the motor generator 108 to decrease the temperature of the motor generator 108 and/or the inverter 106 towards the target temperature. In some embodiments, the feedback controller 428 may operate only when temperature of the power electronics module 106 and/or motor generator 108 exceeds the target temperature, and may be disabled when the temperature of the power electronics module 106 and motor generator 108 is equal to or below the target temperature. In operation, when the feedback controller 428 is enabled, the feedback signal 414 may be subtracted from the target temperature at a subtraction operation 416 to generate a temperature error 420, and the feedback controller 404 may determine a feedback signal or command 422 to adjust control of the pump 412 to minimize the error. The feedback signal or command 420 may then be added to the feedforward signal or command to generate the control signal or command 410 for controlling the pump 412, in an embodiment. In an embodiment, the feedback controller 404 may be a proportional integral (PI) or a proportional integral derivative (PID) controller configured to implement a proportional integral or a proportional integral derivative feedback algorithm to minimize the error. In other embodiments, other suitable feedback controllers may be utilized to minimize the error.

In some embodiments, the controller 400 may include one or more additional control components not illustrated in FIG. 4. For example, the controller 400 may include a rate limiter and/or a saturation limiter, in some embodiments. The control signal or command 410 may pass through the rate limiter and/or a saturation limiter prior to being provided to the pump 412, to protect the pump 412, in some embodiments.

Figure 5:
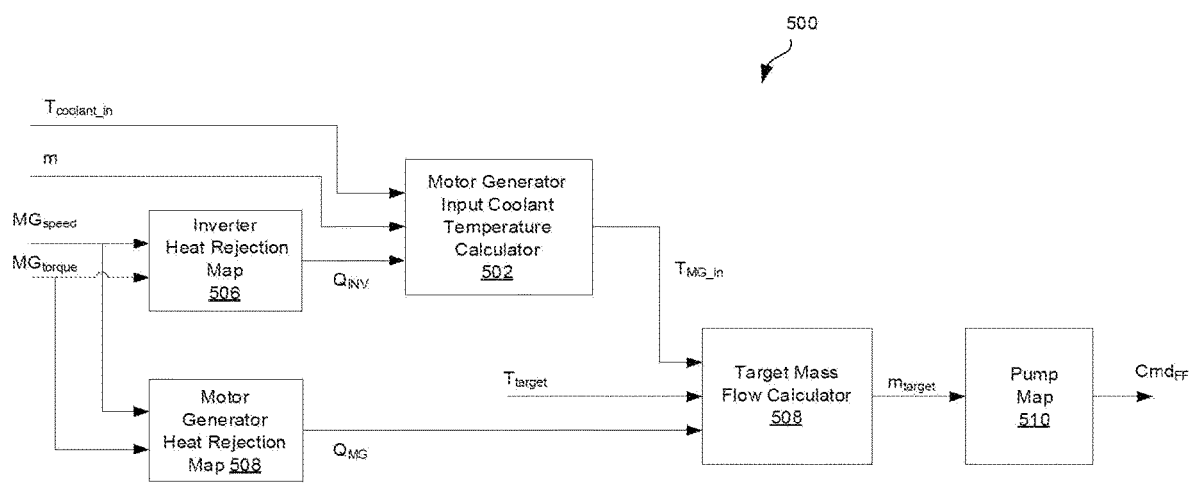
FIG. 5 is a schematic diagram showing an example implementation of a feedforward controller of cooling controller, according to an embodiment.

FIG. 5 is a schematic diagram showing an example implementation of a feedforward controller 500 of a cooling controller, according to an embodiment. The feedforward controller 500 corresponds to the feedforward controller 426 of the cooling controller 400 of FIG. 4, in an embodiment. In another embodiment, the feedforward controller 500 may be utilized with a cooling controller different from the cooling controller 400 of FIG. 4. The feedforward controller 500 may be configured to generate a feedforward control signal to control flow of coolant to provide a desired mass flow of the coolant through a system, to ensure that one or more components of the system are operating at a temperature that does not exceed a target temperature for the one or more components in the system. The feedforward controller 500 may determine the desired mass flow of coolant based current operating conditions of the system. For example, the feedforward controller 500 may determine the desired mass flow based on amount of heat expected to be rejected by the one or more components in the system in a steady state of operation at current operating conditions of the system. For ease of explanation, the feedforward controller 500 is described herein in the context of cooling components of the electric motor system 104 of FIG. 1 and, more particularly, the inverter 106 and the motor generator 108. Moreover, for exemplary purposes, the feedforward controller 500 is described herein in the context of the inverter 106 and the motor generator 108 of the electric motor system 104, arranged in a manner such that coolant flows through the inverter 106 prior to flowing through the motor generator 108. In other embodiments, architectures generally same as or similar to the architecture of the feedforward controller 500 may be utilized to control flow of coolant to other suitable components and/or components arranged in other suitable manners.

The feedforward controller 500 includes a motor generator coolant input temperature calculator 502 and a target mass flow calculator 504. The feedforward controller also includes or is coupled to a memory (or multiple memories) that store an inverter heat rejection map 506, a motor generator heat rejection map 508 and a pump map 510, in an embodiment. The inverter heat rejection map 506 may comprise a three-dimensional lookup table that stores correspondences between amounts of heat rejected by the inverter 106 in steady state of operation at given combinations of speed and torque of the motor generator 108. Similarly, the motor generator heat rejection map 508 may comprise a three-dimensional lookup table that stores correspondences between amounts of heat rejected by the motor generator 108 in steady state of operation at given combinations of speed and torque of the motor generator 108. The pump map 510 may comprise a two dimensional lookup table that stores correspondences between given mass flow and pump control parameters (e.g., control signal or command) needed to produce the corresponding mass flow.

In operation, the controller 500 may determine, based on the current speed and torque of the motor generator 108, amounts of heat expected to be rejected by the inverter 106 and the motor generator 108, by performing respective lookups in the inverter heat rejection map 506 and motor generator heat rejection map 508, in an embodiment. The amount of heat expected to be rejected by the inverter 106, along with the current coolant temperature the current coolant temperature at the input to the inverter 106 and mass flow input to the system 108 through the inverter 106, may be provided to the generator input coolant temperature calculator 502. The motor generator input coolant temperature calculator 502 is configured to calculate, based on the current coolant temperature and mass flow input to the electric motor system 104 and the amount of heat expected to be rejected by the inverter 106, a temperature-rise across of coolant across the inverter 106 and, accordingly, a coolant temperature at the input to the motor generator 108. In an embodiment, the motor generator input coolant temperature calculator 502 is configured to calculate the temperature rise across of coolant across the inverter 106 and, accordingly, a coolant temperature at the input to the motor generator 108 based on $$Q_{inv}=\dot{m}c_p(T_{MG\_in}-T_{inv\_in}) \qquad \text{Equation 1}$$

where $Q_{inv}$ is the amount of heat expected to be rejected by the inverter 106, m is the current mass flow of coolant through the invertor 106, $c_p$ is a constant that may be specific to the inverter 106, $T_{MG\_in}$ is the coolant temperature at the input to the motor generator 108, $T_{inv\_in}$ is the current coolant temperature at the input to the system 104.

With continued reference to FIG. 5, the target mass flow calculator 504 may calculate a target mass flow of coolant through the motor generator 108 based on the coolant temperature at the input to the motor generator 108, the target temperature for the motor generator 108 and the amount of heat expected to be rejected in steady state at current speed and/or torque of the motor generator 108. In an embodiment, the target mass flow calculator 504 is configured to calculate the mass target flow using $$Q_{MG}=B(T_{MG\_in}-T_{MG}) \qquad \text{Equation 2}$$

where B is a function of mass flow that may be specific to the motor generator 108.

Figure 6:
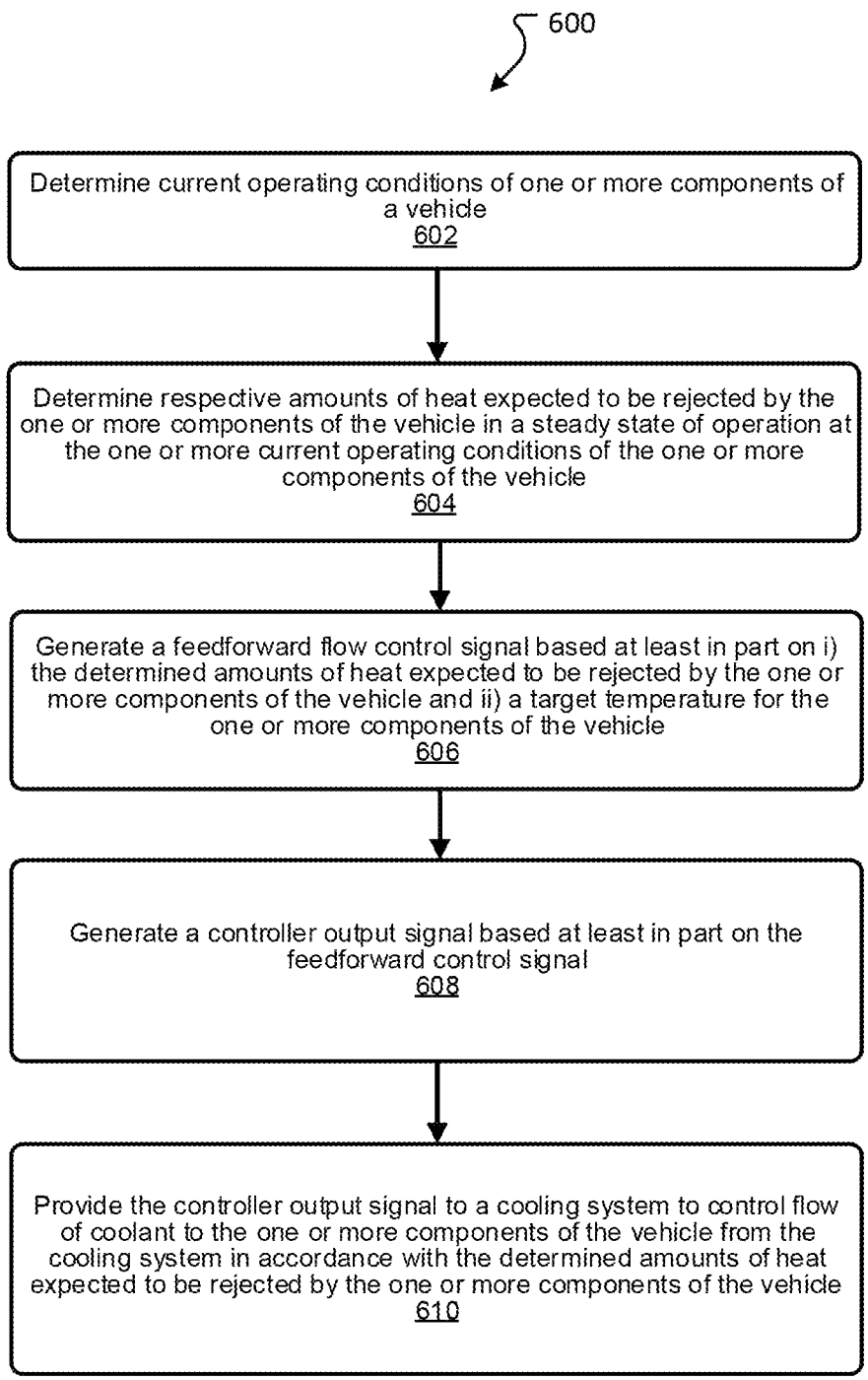
FIG. 6 is a flowchart of a method for cooling one or more components of a vehicle, according to an embodiment.

FIG. 6 is a flowchart of a method for cooling one or more components of a vehicle, according to an embodiment. In an embodiment, the method 600 may be implemented by the controller 120 of the system 100 of FIG. 1. For ease of explanation, the method 600 is described with reference to the system 100 of FIG. 1. However, the method 600 may be implemented in a system different from the system 100 of FIG. 1, in some embodiments.

At block 602, one or more current operating conditions of the one or more components of the vehicle are determined. The one or more current operating conditions may be determined based on input one or more input signals that may be received, for example, from one or more sensors that may be provided for measuring the operating conditions. In another embodiment, the one or more operating conditions may be calculated or estimated based on other operating parameters of the vehicle. The operating conditions may include current speed and/or torque of the motor generator 108, for example. In other embodiments, other suitable operating conditions of the motor generator 108 and/or operating conditions of one or more components different from the motor generator 108 may be utilized. For example, speed and/or torque of the combustion engine 102 may be utilized.

At block 604, respective amounts of heat expected to be rejected by the one or more components of the vehicle in a steady state of operation at the one or more current operating conditions of the one or more components are determined. For example, amount of heat expected to the rejected by one or both of the inverter 106 the motor generator 108 at steady state of operation of the motor generator 108 is determined. The expected amount of heat may be determined based on a lookup in a table (e.g., heat rejection map 502, 504), for example. In another embodiment, suitable heat transfer equations to may be utilized determine amounts of heat expected to the rejected by one or both of the inverter 106 and/or the motor generator 108.

At block 606, a feedforward flow control signal based at least in part on i) the determined amounts of heat expected to be rejected by the one or more components of the vehicle and ii) a target temperature for the one or more components of the vehicle. For example, the feedforward signal 520 based on the amounts of heat expected to the rejected by one or both of the inverter 106 and/or the motor generator 108 as described above with reference to FIG. 5 may be generated. In other embodiments, the feedforward control signal may be generated based at least in part on i) the determined amounts of heat expected to be rejected by the one or more components of the vehicle and ii) a target temperature for the one or more components of the vehicle in other suitable manners.

At block 608, a controller output signal is generated based at least in part on the feedforward control signal. For example, the control signal 132 of FIG. 1 is generated. In another embodiment, another suitable control signal is generated. In an embodiment, the control signal is generated further based on a feedback control signal (e.g., feedback control signal 418), where the feedback control signal corrects for error that may result from control by the feedforward control signal. In some embodiments, feedback control signal may be utilized, when measured current temperature of the one or more components exceeds the target temperature, for example.

At block 610, the controller output signal is provided to a cooling system to control flow of coolant to the one or more components of the vehicle from the cooling system in accordance with the determined amounts of heat expected to be rejected by the one or more components of the vehicle. For example, a variable flow pump within the cooling system may be controlled to operate at a certain speed or rate to provide desired flow of coolant from the cooling system. In other embodiments, other suitable flow control methods may be utilized.

This application is intended to cover any variations, uses, or adaptations of the present disclosure using its general principles. Further, this application is intended to cover such departures from the present disclosure as come within known or customary practice in the art to which the present disclosure pertains and which fall within the limits of the appended claims.

Furthermore, the connecting lines shown in the various figures contained herein are intended to represent functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A. B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for controlling flow of coolant to one or more components of a vehicle, the system comprising:
    a cooling system configured to provide coolant, via a coolant loop, to the one or more components of the vehicle; and
    a controller communicatively coupled to the cooling system, the controller configured to
        receive one or more current operating conditions of the one or more components of the one or more components of the vehicle,
        receive respective amounts of heat expected to be rejected by the one or more components of the vehicle in a steady state of operation at the one or more current operating conditions of the one or more components of the vehicle,
        wherein the controller receives the amounts of heat expected to be rejected by the one or more components of the vehicle by performing a look up in a pump map and at least one of an inverter heat rejection map and a motor generator heat rejection map, the pump map, inverter heat rejection map, and motor generator heat rejection map each comprising relationships between operating conditions of the one or more components and amounts of heat expected to be rejected by the one or more components of the vehicle in the steady state of operation of the one or more components at the one or more current operating conditions; and transmit a feedforward flow control signal based at least in part on i) the received amounts of heat expected to be rejected by the one or more components of the vehicle and ii) a target temperature for the one or more components of the vehicle, transmit a controller output signal based at least in part on the feedforward flow control signal, and provide the controller output signal to the cooling system to control flow of coolant to the one or more components of the vehicle from the cooling system in accordance with the received amounts of heat expected to be rejected by the one or more components of the vehicle.

2. The system of claim 1, wherein the controller is configured to transmit the feedforward flow control signal further based on a current temperature of the coolant at an input to a system comprising the one or more components of the vehicle.

3. The system of claim 1, wherein the controller is further configured to receive at least one feedback signal indicative of a current temperature of the one or more components of the vehicle, transmit a feedback flow control signal based on a difference between the target temperature and the current temperature of the one or more components of the vehicle, and transmit the controller output signal based on both i) the feedforward flow control signal and ii) the feedback flow control signal.

4. The system of claim 1, wherein the vehicle is at least partially electric vehicle that comprises an electric motor, and the one or more components of the vehicle includes at least i) the electric motor and ii) an inverter configured to convert direct current (DC) energy from a battery to alternating current (AC) power for driving the electric motor.

5. The system of claim 4, wherein the one or more current operating conditions of the one or more components of the vehicle include one or both of i) a current speed of the electric motor of the vehicle and ii) a current torque of the electric motor of the vehicle.

6. The system of claim 1, wherein the cooling system includes a variable flow coolant pump configured to pump coolant to the one or more components of the vehicle, and the controller is configured to provide the controller output signal to a control input of the variable flow coolant pump to actuate the variable flow coolant pump in accordance with the received amounts of heat expected to be rejected by the one or more components of the vehicle.

7. The system of claim 6, wherein the controller is further configured to sending, based on received amounts of heat expected to be rejected by the one or more components of the vehicle, a speed of at which to the variable flow coolant pump is to be operated, and transmit the feedforward flow control signal to control the variable flow coolant pump to operate at the sent speed.

8. The system of claim 1, wherein the vehicle is a hybrid electric vehicle that includes a combustion engine and an electric motor, the one or more components of the vehicle include one or more electrical components, including the electric motor of the vehicle, and the coolant loop of the cooling system is coupled to a radiator configured to provide coolant to both the combustion engine and the electric motor of the vehicle.

9. The system of claim 1, wherein the vehicle is a hybrid electric vehicle that includes a combustion engine and an electric motor, the one or more components include one or more electrical components of the vehicle, including the electric motor, and the coolant loop of the cooling system is a first coolant loop coupled to a first radiator configured to provide coolant to the one or more electrical components of the vehicle and a second radiator configured to provide coolant, via a second coolant loop separate from the first coolant loop, the combustion engine of the vehicle.

10. A controller, comprising:

a processor; and a memory including instructions that, when executed by the processor, cause the controller to:

receive one or more current operating conditions of one or more components of a vehicle, receive respective amounts of heat expected to be rejected by the one or more components of the vehicle in a steady state of operation at the one or more current operating conditions of the one or more components of the vehicle, wherein the controller receives the amounts of heat expected to be rejected by the one or more components of the vehicle by performing a look up in a pump map and at least one of an inverter heat rejection map and a motor generator heat rejection map, the pump map, inverter heat rejection map, and motor generator heat rejection map each storing relationships between operating conditions of the one or more components and amounts of heat expected to be rejected by the one or more components of the vehicle in the steady state of operation of the one or more components at the one or more current operating conditions; and transmit a feedforward flow control signal based at least in part on i) the received amounts of heat expected to be rejected by the one or more components of the vehicle and ii) a target temperature for the one or more components of the vehicle, transmit a controller output signal based at least in part on the feedforward flow control signal, and provide the controller output signal to a cooling system to control flow of coolant to the one or more components of the vehicle from the cooling system in accordance with the received amounts of heat expected to be rejected by the one or more components of the vehicle.

11. The controller of claim 10, wherein the instructions, when executed by the processor, cause the controller to transmit the feedforward flow control signal further based on a current temperature of the coolant at an input to a system comprising the one or more components of the vehicle.

12. The controller of claim 10, wherein the instructions, when executed by the processor, further cause the controller to:
receive at least one feedback signal indicative of a current temperature of the one or more components of the vehicle,
transmit a feedback flow control signal based on a difference between the target temperature and the current temperature of the one or more components of the vehicle, and
transmit the controller output signal based on both i) the feedforward flow control signal and ii) the feedback flow control signal.

13. The controller of claim 10, wherein
the vehicle is at least partially electric vehicle that comprises an electric motor, and
the one or more components of the vehicle includes at least i) the electric motor and ii) an inverter configured to convert direct current (DC) energy from a battery to alternating current (AC) power for driving the electric motor.

14. The controller of claim 13, wherein the one or more current operating conditions of the vehicle include one or both of i) a current speed of the electric motor of the vehicle and ii) a current torque of the electric motor of the vehicle.

15. A method, comprising:
receiving, by a controller, one or more current operating conditions of one or more components of a vehicle,
receiving, by the controller, respective amounts of heat expected to be rejected by the one or more components of the vehicle in a steady state of operation at the one or more current operating conditions of the one or more components of the vehicle,
wherein the controller receives the amounts of heat expected to be rejected by the one or more components of the vehicle by performing a look up in a pump map and at least one of an inverter heat rejection map and a motor generator heat rejection map, the pump map, inverter heat rejection map, and motor generator heat rejection map each storing relationships between operating conditions of the one or more components and amounts of heat expected to be rejected by the one or more components of the vehicle in the steady state of operation of the one or more components at the one or more current operating conditions; and
transmitting, by the controller, a feedforward flow control signal based at least in part on i) the received amounts of heat expected to be rejected by the one or more components of the vehicle and ii) a target temperature for the one or more components of the vehicle,
transmitting, by the controller, a controller output signal based at least in part on the feedforward flow control signal, and
providing, by the controller, the controller output signal to a cooling system to control flow of coolant to the one or more components of the vehicle from the cooling system in accordance with the received amounts of heat expected to be rejected by the one or more components of the vehicle.

16. The method of claim 15, wherein transmitting the feedforward flow control signal comprises transmitting the feedforward flow control signal further based on a current temperature of the coolant at an input to a system comprising the one or more components of the vehicle.

17. The method of claim 15, further comprising
receiving, by the controller, at least one feedback signal indicative of a current temperature of the one or more components of the vehicle,
transmitting, by the controller, a feedback flow control signal based on a difference between the target temperature and the current temperature of the one or more components of the vehicle, and
transmitting, by the controller, the controller output signal based on both i) the feedforward flow control signal and ii) the feedback flow control signal.

18. The method of claim 15, wherein
the vehicle is at least partially electric vehicle that comprises an electric motor, and
the one or more components of the vehicle includes at least i) the electric motor and ii) an inverter configured to convert direct current (DC) energy from a battery to alternating current (AC) power for driving the electric motor.

19. The method of claim 18, wherein the one or more operating conditions of the one or more components of the vehicle include one or both of i) a current speed of the electric motor of the vehicle and ii) a current torque of the electric motor of the vehicle.

* * * * *